Figure 1:
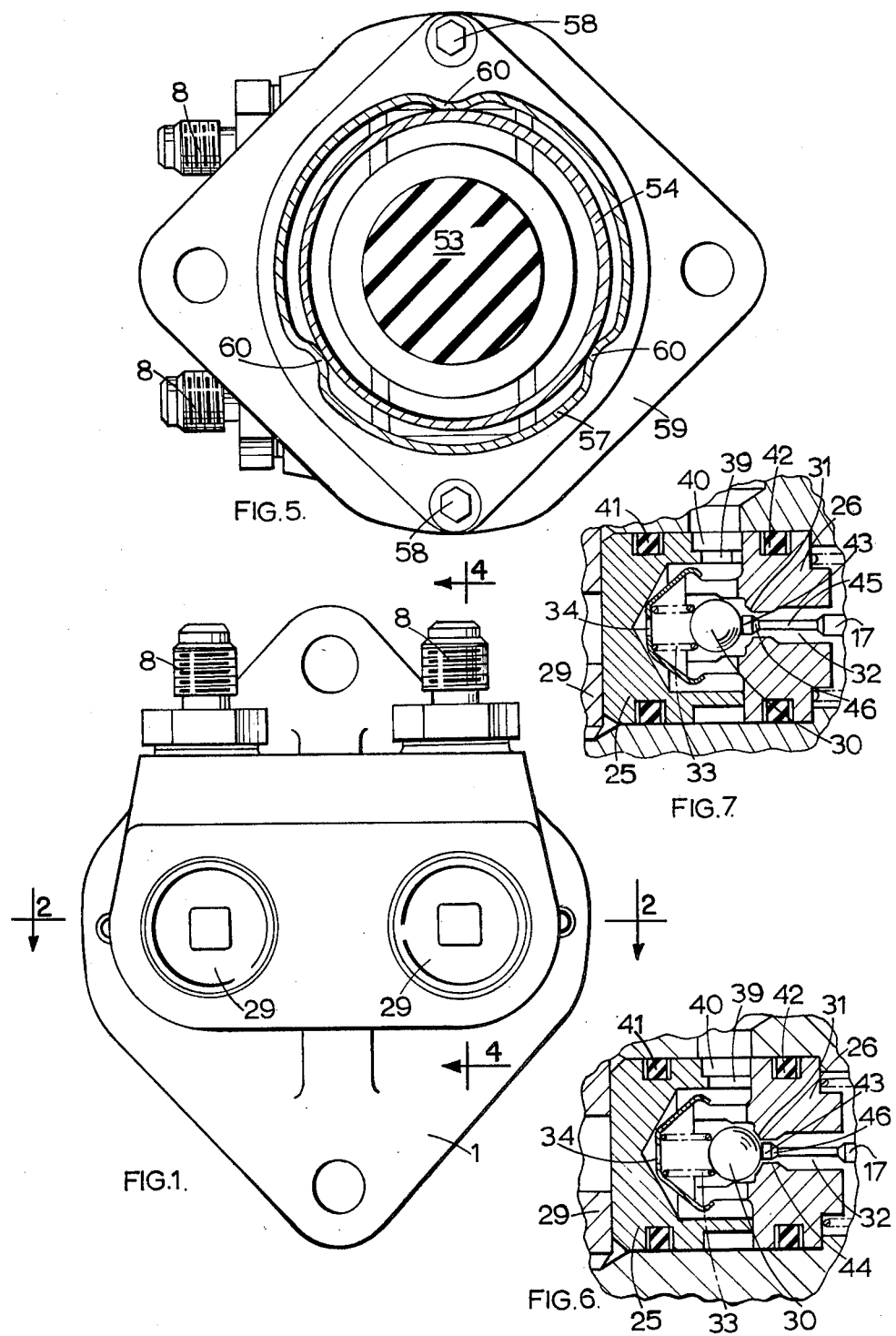

United States Patent [19]

Harries

[11] 4,090,533
[45] May 23, 1978

[54] FLUID VALVE ASSEMBLIES

[75] Inventor: David Anthony Harries, Solihull, England

[73] Assignee: Girling Limited, Birmingham, England

[21] Appl. No.: 749,076

[22] Filed: Dec. 9, 1976

Related U.S. Application Data

[63] Continuation of Ser. No. 586,604, Jun. 13, 1975, abandoned.

[30] Foreign Application Priority Data

Jun. 15, 1974 United Kingdom ............... 26615/74

[51] Int. Cl.² ............................................. B60T 15/06
[52] U.S. Cl. ................................... 137/627.5; 303/54
[58] Field of Search .................... 137/627.5, DIG. 2; 303/40, 50, 52, 54

[56] References Cited

U.S. PATENT DOCUMENTS

| 2,474,738 | 6/1949 | Hollerith | 303/54 X |
|---|---|---|---|
| 2,616,641 | 11/1952 | Gagen | 303/54 |
| 2,752,947 | 7/1956 | Hruska | 303/54 X |
| 2,970,612 | 2/1961 | Lornitzo | 303/50 |
| 3,006,657 | 10/1961 | Augustin | 137/627.5 |
| 3,183,040 | 5/1965 | Gold | 303/54 |

FOREIGN PATENT DOCUMENTS

| 1,063,047 | 8/1959 | Germany | 137/627.5 |
|---|---|---|---|
| 1,300,748 | 2/1963 | Germany | 137/627.5 |

Primary Examiner—Robert G. Nilson
Attorney, Agent, or Firm—Scrivener, Parker, Scrivener and Clarke

[57] ABSTRACT

In a power control valve assembly in which the position of an inlet valve member relative to its seat is controlled by a control rod extending through a passage terminating in the seat, an end portion of the control rod has a profile which gives a variable throttling of flow through the passage in dependence upon the axial position of the control rod. In the valve described the end portion of the rod has an end part of constant diameter connected to a further part of reduced diameter by a sloping shoulder. Two such valve assemblies are shown arranged in parallel and operated through a single resilient block and a balance beam.

5 Claims, 7 Drawing Figures

FLUID VALVE ASSEMBLIES

This is a continuation of application Ser. No. 586,604 filed June 13, 1975 now abandoned.

SPECIFIC DESCRIPTION

This invention relates to a power control valve assembly for a vehicle braking system of the kind incorporating a normally open exhaust valve for controlling a connection between a first port for connection to a vehicle brake and a second port for connection to a reservoir, and a normally closed inlet valve for controlling a connection between said first port and a third port for connection to a fluid pressure source, an actuating member being adapted to close said exhaust valve and then to open said inlet valve upon actuation thereof.

Conventional control valve assemblies of the above kind have the disadvantage that once the initial pressure has been admitted to the brakes they only have, thereafter, a coarse control of the flow and hence the rate of pressure rise, and this gives an incorrect 'feel' at the foot of the driver.

According to the invention in a power control valve assembly of the kind set forth the inlet valve comprises an inlet valve member adapted to co-operate with a valve seat, and a control rod extending with clearance through a passage which terminates in the seat, with one end of the rod controlling the position of the inlet valve member relative to the seat, an end portion of the control rod adjacent to said rod end having a cross-sectional area which varies for at least part of its axial length along the rod so that the throttling effect of the control rod on fluid flow through the passage varies in dependence upon the axial position of the control rod for at least a part of its travel.

The control rod could be integral with the valve member but preferably the valve member comprises a separate ball.

When the push-rod is of circular cross-section the end portion of the push-rod may have any suitable diameter profile but preferably an end part of the end portion is of a substantially constant diameter so that in the initial unseating of the valve member the regulation of the fluid flow is determined substantially by the position of the valve member relative to its seat, but then on further axial movement of the push-rod the shape of the remainder of the end portion of the push-rod has a predominent effect on the flow.

A preferred diameter profile for the end portion of the push-rod comprises an end part of substantially constant diameter connected to an adjacent length of the push-rod of a reduced diameter by a sloping shoulder to give a variable flow area dependent on stroke.

According to another aspect of the invention in a dual control power valve assembly incorporating two power control valve assemblies of the kind set forth arranged in parallel the two assemblies are adapted to be simultaneously actuated by a pedal-operated member acting along the line of symmetry of the complete assembly through a single resilient block upon a laterally extending balance beam connected to the actuating member of each assembly.

Preferably the resilient block is mounted on the balance beam and the pedal operated member comprises a cup slidable in a housing enclosing the block and urgable into engagement with a rounded nose on the block by the pedal.

Figure 2:
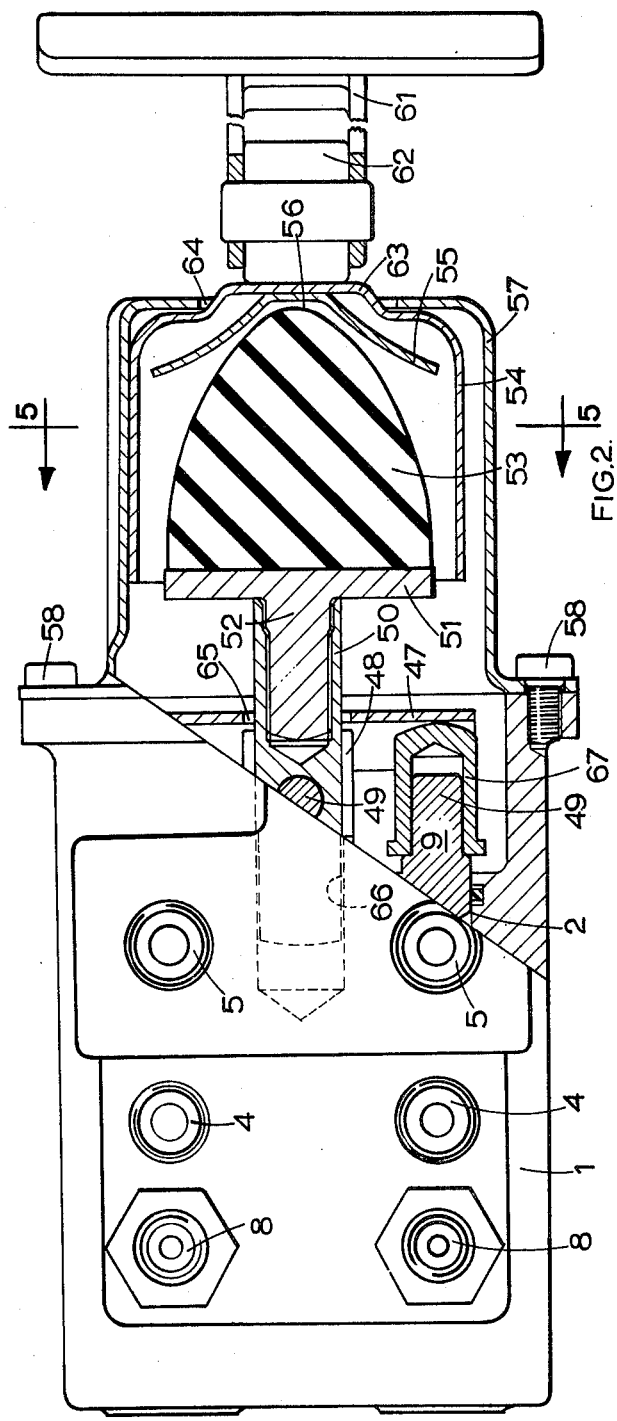
Figure 3:
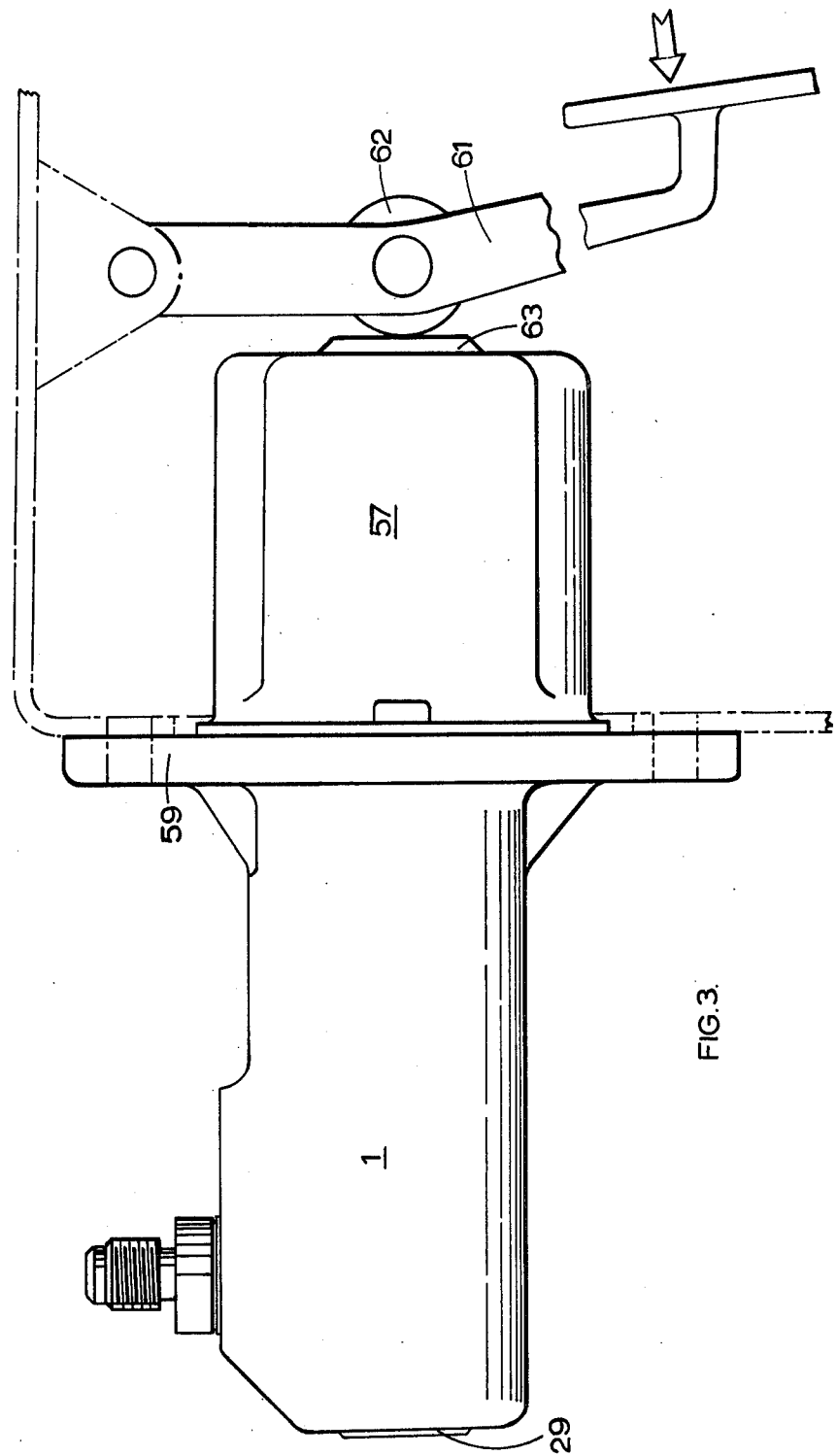
Figure 4:
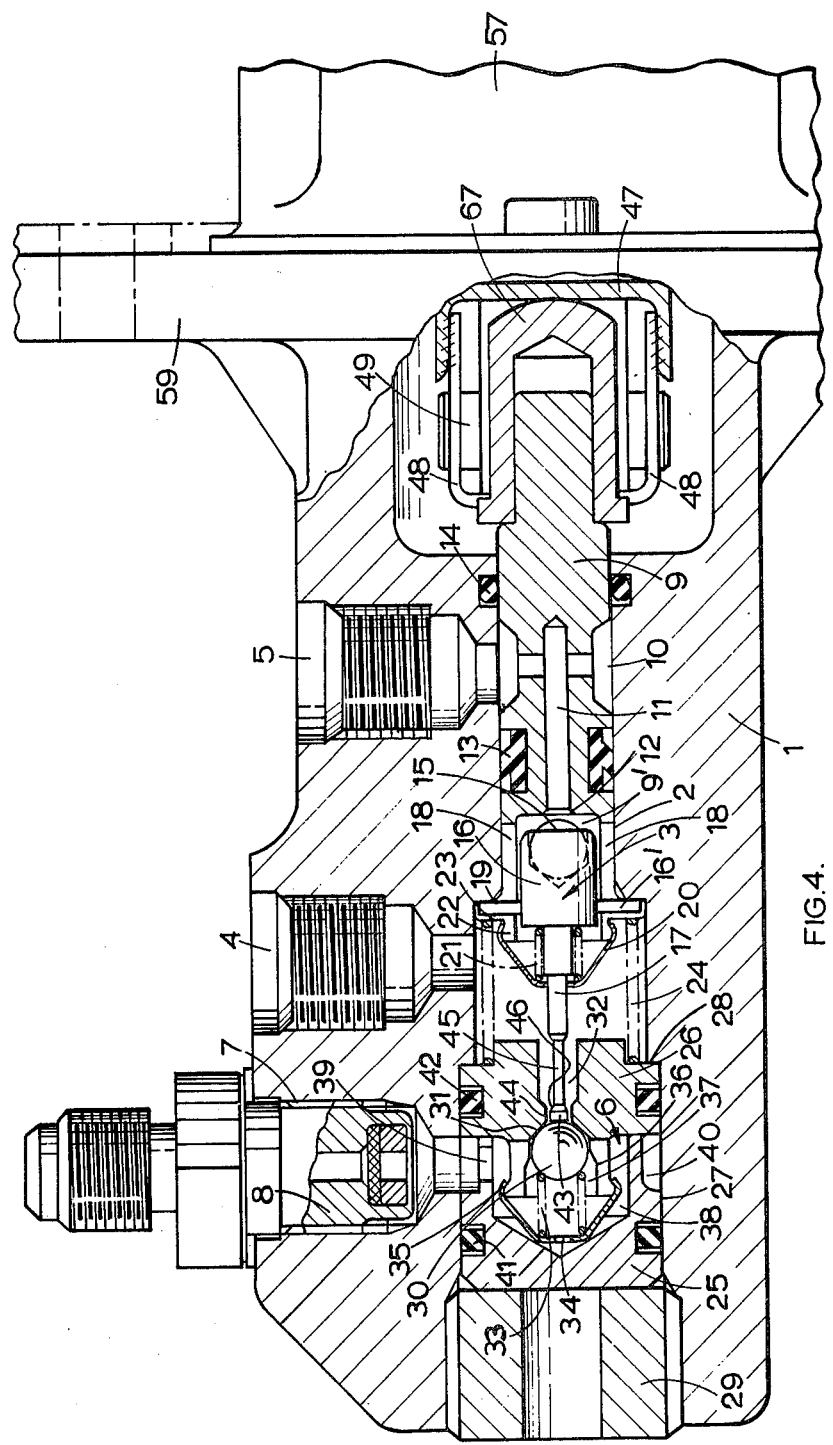

A preferred embodiment of the invention will now be described with reference to the accompanying drawings in which:

FIG. 1 is an end view of a pedal-operated dual control power valve assembly,

FIG. 2 is a plan view of the assembly partly in section on the plane 2—2 of FIG. 1 with the pedal in a retracted position, FIG. 3 is a side elevation of the assembly, FIG. 4 is an enlarged view similar to FIG. 3 but partially in section on the line 4—4 of FIG. 1, the push-rod being shown in a fully retracted position, FIG. 5 is a transverse section of the assembly on the line 5—5 of FIG. 2, FIG. 6 is an enlarged partial sectional view of the inlet valve corresponding to the view of FIG. 4 but with the ball valve member unseated by the push-rod which is in a partially advanced position, and FIG. 7 is a view similar to that of FIG. 6 but with the push-rod in a more advanced position.

A body 1 is provided with two parallel stepped through-bores 2 housing identical control valve assemblies each incorporating a self-contained exhaust valve assembly 3 for controlling fluid flow between a first port 4 for connection to a braking circuit and a second port 5 for connection to a reservoir, and a self-contained inlet valve assembly 6 for controlling fluid flow between a third port 7, adapted by means of a filter assembly 8 to be connected to a pressure fluid source, and the first port 4.

Referring to FIG. 4, an actuating plunger 9 is formed with axial and radial passages 11 communicating at one end with the second port 5 and at the forward end of the plunger with an exhaust valve seat 12. Seals 13 and 14 are provided between the piston and bore portion 10 on each side of the port 5. The plunger 9 is formed with a flange 23 adjacent to its forward end, a return spring 24 for the plunger acting between the rear end of the inlet valve assembly 6 and the flange 23 to urge the flange into engagement with a step 19 in bore 2.

The self-contained exhaust valve assembly 3 comprises a ball valve member 15 carried in the open end of a ball carrier 16 integral with a forwardly extending push-rod 17. The carrier 16 is slidably guided in a counterbore 9' in the forward end of the plunger 9 by a pin 16' extending through a transverse hole in the carrier 16 and guided in a diametrically opposed pair of axial slots 18 in plunger 9.

The valve assembly 3 further comprises a frusto-conical cage 20 housing a spring 21 and snap-fitted over a tubular boss 22 on the forward end of plunger 9. The spring 21 is used only in testing of the valve assembly.

The inlet valve assembly 6 comprises a valve body conveniently formed in two parts 25 and 26 which abut one another and are retained in the largest bore portion 27 of the bore 2 against a further step 28 in the bore by an externally threaded plug 29, removal of which enables removal of both valve assemblies through that end of bore 2.

The assembly 6 further comprises a ball valve member 30 biassed against an annular seat 31 formed at the forward end of a stepped axial passage 32 in body part 26 by a spring 33 held in position by a frusto-conical cage 34 snap-fitted over a rim 35 on the forward end of a tubular extension 36 of the part 26.

The tubular extension 36 is provided with radial slots and is counterbored as at 37 to provide flow passages between the valve seat 31 and a chamber 38 when the ball valve member 30 is unseated by the push-rod 17. Radial passages 39 connect chamber 38 with an annular recess 40 in the exterior of body part 25 which communicates directly with the third port 7.

Seals 41 and 42 are provided in the exterior of body parts 25 and 26 respectively to isolate recess 40.

The push-rod 17 has an end part 43 of constant diameter which is movable with clearance in the reduced diameter part 44 of passage 32 and a length 45 of smaller diameter connected to the end part 43 by a sloping shoulder 46.

The operation of one of the control valve assemblies will now be described.

When actuator plunger 9 is advanced the exhaust valve seat 12 is first brought into engagement with the ball valve member 15 to cut off communication between the first port 4 and the second port 5. On further advancement of piston 9 the ball carrier 16 is moved forwardly against the resistance of spring 21 so that the push-rod 17 begins to unseat the ball valve member 30 of the inlet valve assembly as shown in FIG. 6. Pressure fluid can now start to flow from third port 7 through passage 42 to the first port 4. Since the end part 43 of the push rod is of large diameter it throttles the flow through the valve during the initial opening. This flow area can be controlled reasonably accurately and is almost independent of valve lift during this initial travel.

On further travel of the plunger, portion 45 of smaller diameter is adjacent to the valve seat, as shown in FIG. 7, and there is less restriction. The transition from high to low restriction is controlled by the profile of the changing diameter section 46 of the plunger between 43 and 45.

The progressive operation of this inlet valve overcomes the juddering effect associated with the on-off action of conventional inlet valves where fluid flow is determined entirely by the position of the valve member relative to its seat.

The means for advancing the actuator plungers 9 will now be described.

A channel section balance beam 47 bears at each end of a tappet 67 fitting over the reduced rear end 49 of the corresponding actuator plunger 9 and is welded at its centre to a pair of vertically spaced forwardly projecting plates 48 having a pin connection 49 with a rod 50 which passes rearwardly through an opening 65 in the base of the balance beam 47. A circular plate 51 has an externally threaded spigot 52 screwed into the rod 50 with a rubber block 53 bonded to its rear face. The rod 50 is free to slide in a bore 66 within the body 1 during a brake application.

A cylindrical cup-shaped member 54 provided internally with a dished plate 55 for engaging the nose 56 of the rubber block 53 is slidably guided between three circumferentially spaced ribs 60 of a housing 57 bolted at 58 to a mounting flange 59 on the body 1.

A foot pedal 61 carries a trunnioned roller 62 for engagement with the outer end 63 of the cup member 54 which projects through an aperture 64 in the end of the housing.

When the foot pedal is operated the cup member 54 is moved forwardly so that the dished plate 55 engages with the nose 56 of the rubber block 53 to advance the balance beam 47 and the two actuator plungers 9.

It will be appreciated that the shaped rubber block 53 provides a resilient connection between the foot pedal 61 and the actuator plungers 9.

I claim:

1. A power control valve assembly for a vehicle braking system comprising a housing provided with first, second and third ports for connection respectively to a vehicle brake, a reservoir, and a fluid pressure source, a normally closed inlet valve controlling communication between said first and third ports, said inlet valve comprising an axially moveable inlet valve element and a relatively fixed inlet valve seat disposed between said first and third ports and being normally in engagement with each other so that communication between said ports is normally closed, a normally open exhaust valve controlling communication between said first and second ports, said exhaust valve comprising an axially moveable exhaust valve element and an axially moveable exhaust valve seat disposed between said first and second ports and being normally spaced apart from each other so that said first and second ports are normally in open communication with each other, said inlet valve being axially spaced from said exhaust valve, a passage extending axially between said inlet valve seat and a chamber which is at all times in open communication with said first port to provide fluid communication between said inlet valve seat and said chamber, an axially moveable control rod extending through said passage with clearance thoughout its length which permits fluid flow through said passage past said rod to said chamber, said rod having an axially extending end part of substantially uniform cross sectional area throughout its length and located in said passage adjacent said inlet valve for operating on said inlet valve element to control its position relative to said inlet valve seat, the other end of said control rod engaging with said exhaust valve, and an axially moveable valve actuating member acting on said exhaust valve and arranged to close said exhaust valve element against said exhaust valve seat and then to move said control rod until the end part thereof disengages said inlet valve element from said inlet valve seat, that part of said rod adjacent said end part being of reduced cross sectional area relative to said end part, the cross sectional area of said end part being of a size relative to said passage that during initial unseating of said inlet valve element said end part exerts a substantially constant throttling effect on flow through said passage.

2. A power control valve assembly as in claim 1 wherein said inlet valve is separate from said control rod, and including resilient means acting on said valve element to maintain it in engagement with said inlet valve seat and with said control rod following disengagement of said element from said seat by said rod.

3. A power control valve assembly as in claim 1 wherein said end part of said rod is of cylindrical shape throughout its length and the reduced diameter part is of circular cross-section.

4. A power control valve assembly as in claim 3 in which the end part and the reduced diameter part of said rod are connected by a sloping shoulder.

5. A power control valve assembly as in claim 3 wherein said passage is provided at its end opposite to said valve seat with a counterbore.

* * * * *